US012196989B2

(12) United States Patent
Fromentin et al.

(10) Patent No.: US 12,196,989 B2
(45) Date of Patent: Jan. 14, 2025

(54) OPTICAL ELEMENT COMPRISING MIX OF NIR DYES FOR BROADER NIR CUT AND BETTER AESTHETIC

(71) Applicant: Essilor International, Charenton-le-Pont (FR)

(72) Inventors: Pierre Fromentin, Bangkok (TH); Harutsai Waipunya, Bangkok (TH); Haifeng Shan, Dallas, TX (US); Hao-Wen Chiu, Dallas, TX (US)

(73) Assignee: Essilor International, Charenton-le-pont (FR)

( * ) Notice: Subject to any disclaimer, the term of this patent is extended or adjusted under 35 U.S.C. 154(b) by 631 days.

(21) Appl. No.: 17/442,473

(22) PCT Filed: Mar. 23, 2020

(86) PCT No.: PCT/EP2020/057975
§ 371 (c)(1),
(2) Date: Sep. 23, 2021

(87) PCT Pub. No.: WO2020/193473
PCT Pub. Date: Oct. 1, 2020

(65) Prior Publication Data
US 2023/0056732 A1   Feb. 23, 2023

(30) Foreign Application Priority Data

Mar. 25, 2019 (EP) ..................... 19305371

(51) Int. Cl.
*G02B 5/20* (2006.01)
*G02B 1/04* (2006.01)
(Continued)

(52) U.S. Cl.
CPC ............. *G02B 5/208* (2013.01); *G02B 1/041* (2013.01); *G02B 5/206* (2013.01); *G02B 5/223* (2013.01); *G02C 7/108* (2013.01)

(58) Field of Classification Search
CPC .......... G02B 5/223; G02B 5/22; G02B 5/206; G02C 7/108
See application file for complete search history.

(56) References Cited

U.S. PATENT DOCUMENTS

2007/0090331 A1*   4/2007   Seo .................... C09B 23/0008
252/587
2012/0243077 A1    9/2012   Osawa et al.
(Continued)

FOREIGN PATENT DOCUMENTS

DE   19942396      3/2001
EP   1602700       12/2005
(Continued)

OTHER PUBLICATIONS

European Office Action in corresponding European Application No. 19305372.5, dated Nov. 10, 2022.
(Continued)

*Primary Examiner* — Ryan D Howard
(74) *Attorney, Agent, or Firm* — Norton Rose Fulbright US LLP (57) ABSTRACT

Disclosed are optical elements that contains two or more near infrared absorbers and methods of producing the same. Two near infrared absorbers with different near infrared wavelengths absorption ranges and residual colors are mixed with a precursor of an optical substrate. The resulting mixture is subsequently processed to produce optical elements that have a broad near infrared wavelength absorption range and a neutral residual color.

14 Claims, 6 Drawing Sheets (51) Int. Cl.
*G02B 5/22* (2006.01)
*G02C 7/10* (2006.01)

(56) References Cited

U.S. PATENT DOCUMENTS

2018/0201718 A1    7/2018  Sik et al.
2022/0171216 A1*   6/2022  Shan ..................... G02B 5/223

FOREIGN PATENT DOCUMENTS

| EP | 1876212 | 1/2008 |
| EP | 2138887 | 12/2009 |
| EP | 2402794 | 1/2012 |
| EP | 2768895 | 8/2014 |
| EP | 3296352 | 3/2018 |
| EP | 3296775 | 3/2018 |
| EP | 3318920 | 5/2018 |
| EP | 3407119 B1 | 11/2018 |
| JP | 2009185161 | 8/2009 |
| JP | 201116483 | 8/2011 |
| JP | 2011-237625 | 11/2011 |
| JP | 2017-529415 | 10/2017 |
| JP | 2018-529829 | 10/2018 |

OTHER PUBLICATIONS

International Search Report & Written Opinion issued in priority application No. PCT/EP2020/057975, dated Mar. 25, 2019.
International Search Report & Written Opinion issued in related application No. PCT/EP2020/057974, dated Mar. 25, 2019.

* cited by examiner

100

---

Provide a precursor material for an optical substrate and two or more near infrared absorbers that have different near infrared cut ranges and/or different residual colors
101

↓

Determine a concentration for each of the two or more infrared absorbers in the optical substrate, at which the synergistic color intensity of the two or more near infrared absorbers is lower than the individual color intensity of any of the two or more near infrared absorbers
102

↓

Mix the precursor material with the two or more near infrared absorbers at the determined concentrations to produce a mixture
103

↓

Produce the optical element using the mixture of the optical substrate and the two or more near infrared absorbers
104

OPTICAL ELEMENT COMPRISING MIX OF NIR DYES FOR BROADER NIR CUT AND BETTER AESTHETIC

CROSS-REFERENCE TO RELATED APPLICATIONS

This application is a national phase application under 35 U.S.C. § 371 of International Application No. PCT/EP2020/057975 filed 23 Mar. 2020, which claims priority to European Patent Application No. 19305371.7 filed 25 Mar. 2019. The entire contents of each of the above-referenced disclosures is specifically incorporated by reference herein without disclaimer.

FIELD OF INVENTION

The present invention concerns an optical element and a method of making the same. More specifically, the present invention concerns an optical element that contains multiple near-infrared dyes in an optical substrate and a method of making the optical element.

BACKGROUND OF THE INVENTION

Infrared (IR) radiation is electromagnetic radiation with longer wavelengths than visible light. Infrared radiation generally has wavelengths in a range of 780 nm to 1 mm, which can be divided into three sub-regions including: near infrared (NIR) range, with wavelengths of 780 to 3000 nm; mid infrared (MIR) range, with wavelengths of 3 µm to 50 µm; and far infrared (FIR) range, with wavelengths of 50 to 1000 µm.

Extensive studies have been conducted to evaluate of impact of NIR radiation on the eyes. The results of the studies have shown that NIR is absorbed by retinal pigment epithelium. Depending on fluence rate, total dose, and spectral characteristics of the NIR, it can cause structural retinal damage via at least one of photomechanical (photoacoustic) process, photothermal (heating) process, and photochemical process. Furthermore, many research results have indicated a strong correlation between chronic NIR exposure and occurrence of cataract in the eyes. Thus, it is desirable to limit exposure of eyes to NIR radiation.

Optical filtering means are generally incorporated in optical articles (e.g., ophthalmic lens materials) to reduce or prevent NIR light from reaching the retina. More specifically, two types of NIR filters including NIR absorbing filters and interferential filters (e.g., reflective filters) can be used on optical lenses to provide protection for eyes against NIR radiation. However, designing a multifunctional filter with optimized NIR absorption performance along with other functions, including antireflective function, is challenging, as high NIR absorption is proved to be detrimental to antireflective performances of optical filters. An NIR absorber can be incorporated into optical coating(s) that is deposited on optical articles. However, direct incorporation of a NIR absorber in an optical coating can significantly increase the production cost of the lens and, at the same time, degrade the mechanical properties of the optical coating, Another option for improving NIR protection can include incorporating an NIR absorber into the bulk substrate of the optical article by impregnation of the substrate or mixing a substrate precursor with a NIR absorber. However, a commercial NIR absorber generally has a relatively narrow NIR absorption range, resulting in lenses or other optical articles with insufficient NIR protection. Additionally, these absorbers generally also absorb visible light in the wavelengths range of 380 to 780 nm, thereby imparting color(s) to the lenses or other optical articles, affecting color perception of the wearers and changing the cosmetic aspects of the lenses using the absorber.

Overall, while optical lenses or other optical articles with NIR protection and the methods of producing the same exist, the need for improvements in this field persists in light of at least the aforementioned drawbacks for these optical lenses or optical articles.

SUMMARY OF THE INVENTION

A solution to the above-mentioned problems associated with optical elements with near infrared (NIR) protection has been discovered. The solution resides in an optical element comprising a polymer matrix and two or more near infrared absorbers. The near infrared absorbers can be substantially homogenously mixed in the polymeric substrate. Thus, no additional filters or coatings are used for NIR protection, resulting in reduced production cost for the optical articles compared to optical articles that uses a filter or an optical coating for NIR absorption. Furthermore, the two or more near infrared absorbers in the optical element may have different near infrared ranges such that the optical article is capable of absorbing near infrared radiation in a broader wavelength range compared to conventional NIR protective optical articles. Moreover, the two or more near infrared absorbers in the optical elements may have different residual colors such that the synergistic residual color intensity is minimized, improving the cosmetic aspect of the optical articles with a NIR protective absorber. Therefore, the optical elements of the present invention provide a technical achievement over at least some of the problems associated with the currently available NIR protective optical articles.

Some embodiments of the present invention are directed to an optical element. The optical element may comprise an optical substrate and two or more near infrared absorbers mixed in the optical substrate. The two or more near infrared absorbers can have different near infrared cut ranges and different residual colors.

Some embodiments of the present invention are directed to a method of preparing an optical element. The method may comprise providing a precursor material for the optical substrate and two or more near infrared absorbers that have different near infrared cut ranges and/or different residual colors. The method may comprise determining a concentration for each of the two or more infrared absorbers in the optical substrate, at which the synergistic color intensity of the two or more near infrared absorbers is lower than the individual color intensity of any of the two or more near infrared absorbers. The method may comprise mixing the precursor material with the two or more infrared absorbers at the determined concentrations to produce a substantially homogenous mixture. The method may comprise producing the optical element using the mixture of the optical substrate and the two or more infrared absorbers.

Some embodiments of the present invention are directed to a method of preparing an optical element. The method may comprise providing a precursor material for the optical substrate and two or more near infrared absorbers that have different near infrared cut ranges and/or different residual colors. The method may comprise determining a concentration for each of the two or more infrared absorbers in the substrate, at which synergistic color intensity of the two or more near infrared absorbers is lower than the individual color intensity of any of the two or more near infrared absorbers. The method may comprise dissolving the two or more infrared absorbers in a first amount of the precursor material to produce a near infrared dye master batch. The method may comprise mixing a second amount of the precursor material with one or more of an ultraviolet dye, a monomer, a catalyst, and a releasing agent, at a temperature of 23 to 27° C. under vacuum to produce a first mixture that is substantially homogenous. The method may comprise cooling the first mixture to a temperature of 0 to 4° C. The method may comprise flowing an inert gas over the cooled first mixture. The method may comprise mixing the near infrared dye master batch into the first mixture under vacuum at a temperature of 0 to 4° C. to produce a second mixture and all ranges and values there between. The second mixture can be a substantially homogenous mixture with each of the two or more near infrared absorbers at its determined concentration. The method may comprise producing the optical element using the second mixture via casting.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %," "vol. %," or "mol. %" refers to a weight, volume, or molar percentage of a component, respectively, based on the total weight, the total volume, or the total moles of material that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

DESCRIPTION OF THE DRAWINGS

For a more complete understanding, reference is now made to the following descriptions taken in conjunction with the accompanying drawings, in which:

FIGS. 2A to 2C show residual colors comparison of an ophthalmic lens containing two or more near infrared absorbers and ophthalmic lenses containing one of the near infrared absorbers.

FIGS. 3A and 3B show spectral transmittance plots for single near infrared absorber-containing lenses, and a lens that contains two near infrared absorbers.

DETAILED DESCRIPTION OF THE INVENTION

The currently available optical articles with NIR protection function suffer the deficiencies including complicated production process, high production cost, protection against insufficient NIR wavelengths range, effects on users color perception, and change on the color of optical articles. The present invention provides a solution to at least some of these problems. The solution is premised on an optical element that includes two or more NIR absorbers mixed in a polymeric substrate. The two or more near infrared absorbers may have different NIR absorption ranges such that the optical element has a broader NIR absorption range than each of the near infrared absorbers. Additionally, the two or more near infrared absorbers can have different residual colors such that the near infrared absorbers synergistically have a neutral residual color.

These and other non-limiting aspects of the present invention are discussed in further detail in the following sections.

A. Optical Element with Near Infrared Protection

Near infrared radiation has been proved to cause damage in the eyes. Optical elements, such as ophthalmic lenses, can incorporate near infrared protection function to protect users' eyes. However, conventionally, a near infrared absorber is generally incorporated in an optical filter, which requires further processes to be applied on the optical element, or in an optical coating, which can be negatively affected in terms of mechanical strength by the near infrared absorber. Furthermore, the near infrared absorber can also affect the user's color perception and change the cosmetic look of the optical element.

The optical element disclosed herein is capable of expanding the near infrared wavelengths cut range of an optical element and minimizing the residual color of the optical element by incorporating, in the substrate of the optical element, two or more near infrared absorbers with different absorption ranges and/or different residual colors. Some embodiments include an optical element. In some instances, the optical element can be an ophthalmic lens. The optical element may comprise a front surface and a back surface. The front surface of the optical element may comprise a convex surface of the ophthalmic lens. The back surface of the optical element may comprise a concave surface of the ophthalmic lens.

In embodiments of the invention, the optical element can comprise an optical substrate and two or more near infrared absorbers mixed in the optical substrate. In some aspects, the two or more near infrared absorbers may have different near infrared cut ranges and/or different residual colors. Non limiting examples of the optical substrate include allyl diglycol carbonate, polyurethane, acrylic, polycarbonate, polyamide, poly(methyl methacrylate), co-polyester, cellulose triacetate, polyepisulfides, trivex, polyacrylics, polyols, polyamines, polyanhydrides, polycarboxilic acids, polyepoxides, polyisocyanates, polynorbornenes, polysiloxanes, polysilazanes, polystyrenes, polyolefinics, polyesters, polyimides, polyurethanes, polythiourethanes, polyallylics, polysulfides, polyvinylesters, polyvinylethers, polyarylenes, polyoxides, polysulfones, poly cyclo olefins, polyacrylonitriles, polyethylene terephtalates, polyetherimides, polypentenes, or any combination thereof. Non-limiting examples of the near infrared absorbers can include polymethine, phthalocyanine, porphyrine, triphenylmethane, iminium, squarylium, croconium, dithiolene, quinone, polyperylene, pyrilium, thiopyrilium, cyanine, or any combination thereof.

In some aspects, the total concentration of the two or more near infrared absorbers may be in a range of 1 to 500 ppm and all ranges and values there between including ranges of 1 to 25 ppm, 25 to 50 ppm, 50 to 75 ppm, 75 to 100 ppm, 100 to 125 ppm, 125 to 150 ppm, 150 to 175 ppm, 175 to 200 ppm, 200 to 225 ppm, 225 to 250 ppm, 250 to 275 ppm, 275 to 300 ppm, 300 to 325 ppm, 325 to 350 ppm, 350 to 375 ppm, 375 to 400 ppm, 400 to 425 ppm, 425 to 450 ppm, 450 to 475 ppm, and 475 to 500 ppm. In some aspects, the two or more near infrared absorbers can be mixed in the optical substrate substantially homogenously. Alternatively, the two or more near infrared absorbers may be mixed in the optical substrate non-homogeneously. In some aspects, the two or more near infrared absorbers may have a concentration gradient (increase or decrease) along any direction in the optical substrate, including directions of horizontal, vertical, and depth of the optical substrate. In some instances, the two or more near infrared absorbers may be mixed with a higher concentration in the front portion and/or the back portion of the optical substrate than the middle portion of the optical substrate. The front portion may include about a third of the thickness of the optical substrate that is proximal to a front surface of the optical substrate. The back portion may include about a third of the thickness of the optical substrate that is proximal to a back surface of the optical substrate.

In some aspects, the two or more near infrared absorbers in the optical substrate can be adapted to generate a synergistic infrared absorption level that is higher than individual near infrared absorption level of any of the two or more near infrared absorbers. The optical element may be capable of absorbing near infrared radiation of the wavelengths range of 780 to 2000 nm and all ranges and values there between including ranges of 780-820 nm, 820 to 860 nm, 860 to 900 nm, 900 to 940 nm, 940 to 980 nm, 980 to 1020 nm, 1020 to 1060 nm, 1060 to 1100 nm, 1100 to 1140 nm, 1140 to 1180 nm, 1180 to 1200 nm, 1200 to 1240 nm, 1240 to 1280 nm, 1280 to 1320 nm, 1320 to 1360 nm, 1360 to 1400 nm, 1400 to 1440 nm, 1440 to 1480 nm, 1480 to 1520 nm, 1520 to 1560 nm, 1560 to 1600 nm, 1600 to 1640 nm, 1640 to 1680 nm, 1680 to 1720 nm, 1720 to 1760 nm, 1760 to 1800 nm, 1800 to 1840 nm, 1840 to 1880 nm, 1880 to 1920 nm, 1920 to 1960 nm, 1960 to 2000 nm. In some aspects, the two or more near infrared absorbers in the optical substrate are adapted to generate a synergistic infrared absorption level that is higher than individual near infrared absorption level of any of the two or more near infrared absorbers. In some instances, the two or more near infrared absorbers can be adapted to synergistically reduce the intensity of near infrared radiation by 15 to 95% (determined as $TsIR_{780-2000}(\%)$) and all ranges and values there between including ranges of 15 to 20%, 20 to 25%, 25 to 30%, 30 to 35%, 35 to 40%, 40 to 45%, 45 to 50%, 50 to 55%, 55 to 60%, 60 to 65%, 65 to 70%, 70 to 75%, 75 to 80%, 80 to 85%, 85 to 90%, and 90 to 95%. In some aspects, the two or more near infrared absorbers are adapted to synergistically cause less than 10% (determined as Tv % (D65)) reduction on the average optical transmittance in the 380-780 nm wavelength range for the optical substrate.

In some aspects, the two or more near infrared absorbers in the optical substrate can be adapted to generate a synergistic color intensity that is lower than individual color intensity of each of the two or more near infrared absorbers. In some instances, the synergistic color intensity of the two or more infrared absorbers in the optical substrate can be in a range of 0 to 5 and all ranges and values there between including ranges of 0 to 0.5, 0.5 to 1, 1 to 1.5, 1.5 to 2, 2 to 2.5, 2.5 to 3, 3 to 3.5, 3.5 to 4, 4 to 4.5, and 4.5 to 5. In some aspects, the two or more near infrared absorbers in the optical substrate are synergistically neutral colored, or preferably achromatic. In some instances, the optical substrate of the optical element can be colorless (or achromatic) and the optical element, which includes the optical substrate and the two or more near infrared absorbers, can be neutral colored or preferably achromatic.

Alternatively, in some instances, the optical element can include an ophthalmic sunglasses, and the two or more near infrared absorbers have a high synergistic chroma. The two or more near infrared absorbers can be adapted to cause 10 to 95% (determined as Tv % (D65)) reduction on the average optical transmittance in the 380-780 nm wavelength range for the optical element and all ranges and values there between including ranges of 10 to 15%, 15 to 20%, 20 to 25%, 25 to 30%, 30 to 35%, 35 to 40%, 40 to 45%, 45 to 50%, 50 to 55%, 55 to 60%, 60 to 65%, 65 to 70%, 70 to 75%, 75 to 80%, 80 to 85%, 85 to 90%, and 90 to 95%.

In some aspects, the optical element may further comprise one or more additional coatings in a covering relationship with the front surface and/or the back surface of the optical element. Non-limiting examples of the one or more additional coatings may include a polarizing coating, a mirror coating, an anti-reflective coating, an abrasion-resistant coating, a photochromic coating, an anti-smudge coating, an anti-fog coating, a tintable coating, a self-healing coating, an anti-rain coating, an anti-static coating, an anti-ultraviolet coating, an anti-blue light coating, or any combination thereof.

B. Method of Producing Optical Element with NIR Absorbers

Conventionally, near infrared light absorbing optical elements (e.g., ophthalmic lenses) can be produced by incorporating an multifunctional optical filter that integrates near infrared absorbing and antireflective functions to a surface of the optical element, or by depositing an optical coating that incorporates a near infrared absorbers in an conventional optical coating (e.g., antireflective coating). However, for an optical filter, a high NIR absorption level can be detrimental to the antireflective performance of optical filter. For the optical coating that includes a near infrared absorbers, the production cost can be high and, at the same time, the mechanical properties of the optical coating can be degraded.

Figure 1:
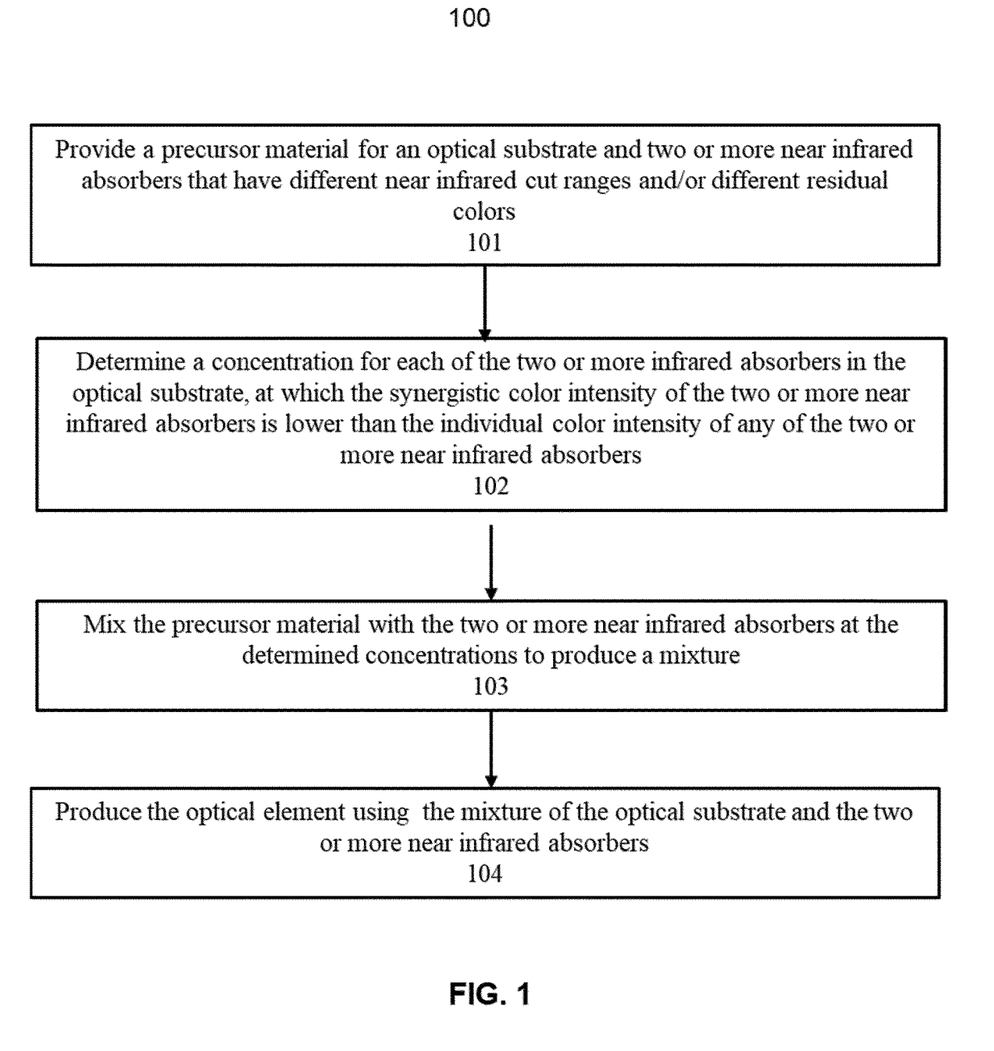
FIG. 1 shows a schematic flowchart for a method of producing an optical element containing two or more near infrared absorbers, according to disclosed embodiments.

The method disclosed herein avoids the use of optical filters and optical coatings for near infrared absorbing purposes by directly mixing the near infrared absorbers in an optical substrate. Furthermore, the method disclosed herein selects two or more near infrared absorbers with different absorption ranges (NIR cut ranges) and/or different residual colors that result in broader near infrared absorption range and neutral color for the produced optical element. As shown in FIG. 1, embodiments include method 100 of preparing an optical element that is capable of absorbing near infrared radiation. In some aspects, the optical element may include an ophthalmic lens.

In some embodiments, as shown in block 101, method 100 may comprise providing a precursor material for the optical substrate and the two or more near infrared absorbers that have different near infrared cut ranges and/or different residual colors. Non limiting examples of the precursor material for the optical substrate can include allyl monomers including allyl diglycol carbonate and thiourethane polymer precursors (e.g., blends of isocyanates and thiols), polyurethane, acrylic, polycarbonate, polyamide, poly(methyl methacrylate), co-polyester, cellulose triacetate, polyepisulfides, trivex, polyacrylics, polyols, polyamines, polyanhydrides, polycarboxilic acids, polyepoxides, polyisocyanates, polynorbornenes, polysiloxanes, polysilazanes, polystyrenes, polyolefinics, polyesters, polyimides, polyurethanes, polythiourethanes, polyallylics, polysulfides, polyvinylesters, polyvinylethers, polyarylenes, polyoxides, polysulfones, poly cyclo olefins, polyacrylonitriles, polyethylene terephtalates, polyetherimides, polypentenes, or any combination thereof. Non-limiting examples of the near infrared absorbers can include polymethine, phthalocyanine, porphyrine, triphenylmethane, iminium, squarylium, croconium, dithiolene, quinone, polyperylene, pyrilium, thiopyrilium, cyanine, or any combination thereof. In some aspects, non-limiting examples of isocyanates can include 1,3-Bis(isocyanatomethyl)cyclohexane, 1,4-Bis(isocyanatomethyl)cyclohexane, m-Xylylene diisocyanate, 5-Isocyanato-1-(isocyanatomethyl)-1,3,3-trimethylcyclohexane, 4,4'-Methylene dicyclohexyl diisocyanate, 4,4'-Methylenebis (phenyl isocyanate), Hexane-1,6-diisocyanate, Trans-1,4-Diisocyanatocyclohexane, Toluene diisocyanate, 1,5-pentamethylene diisocyanate, 2,5-bicyclo [2,2,1] heptane bis(methyl isocyanate), bis(isocyanate methyl ethyl)benzene and for thiols: 4,8-dimercaptomethyl-1,11-dimercapto-3,6,9-trithiaundecane, 5,7-dimercaptomethyl-1,11-dimercapto-3,6,9-trithiaundecane, 4,7-dimercaptomethyl-1,11-dimercapto-3,6,9-trithiaundecane, 2,3-Bis(2-mercaptoethylthio)propane-1-thiol OR 4-mercaptomethyl-3,6-dithia-1,8-octanedithiol, bis-(2,2-sulphydryl)ethyl tetrasulfide, Pentaerythritol tetrakis(3-mercaptopropionate), Pentaerythritol tetrakis(3-mercaptoacetate), thiodiglycol mercaptan, OR 3-Thiapentane-1,5-diol, 2,5-dimercaptomethyl-1,4-dithiane, 1,5-dimercapto-3-thiapentane, propane-trithiol, bis(b-epithiopropyl) sulfide, bis(b-epithiopropyl) disulfide, 4,6-(mercaptomethylthio)-1,3-dithiane, 4,5-(mercaptomethylthio)-1,3-dithiolane, 1,1,3,3-tetrakis(mercaptomethylthio)ethane, 1,1,3,3-tetrakis(mercaptomethylthio) propane. Non-limiting examples of the near infrared absorbers can include polymethine, phthalocyanine, porphyrine, triphenylmethane, iminium, squarylium, croconium, dithiolene, quinone, polyperylene, pyrilium, thiopyrilium, cyanine, or any combination thereof. In some aspects, the providing at block 101 may include selecting two or more of the near infrared absorbers in view of a target near infrared wavelengths absorption range and/or a target residual color.

In some embodiments, as shown in block 102, method 100 may comprise determining a concentration for each of the two or more infrared absorbers in the optical substrate, at which the synergistic color intensity of the two or more near infrared absorbers is lower than the individual color intensity of any of the two or more near infrared absorbers. In some aspects, the two or more near infrared absorbers can be adapted to generate a synergistic infrared absorption range that is broader than the individual infrared absorption range of each of the two or more near infrared absorbers. In some aspects, the determining may include a trial-and-error method to obtain concentration for each near infrared absorbers that can achieve a target synergistic near infrared absorption range, a target synergistic near infrared absorption level, and/or a target synergistic residual color.

In some embodiments, as shown in block 103, method 100 may comprise mixing the precursor material with the two or more infrared absorbers at the concentrations determined at block 102 to produce a mixture. In some aspects, the mixture can be substantially homogenous. In some aspects, mixing at block 103 may comprise dissolving the two or more infrared absorbers in a first amount of the precursor material to produce a near infrared dye master batch. The infrared dye master batch may comprise about 10 to 45 ppm of the two or more near infrared absorbers and all ranges and values there between including ranges of 10 to 15 ppm, 15 to 20 ppm, 20 to 25 ppm, 25 to 30 ppm, 30 to 35 ppm, 35 to 40 ppm, and 40 to 45 ppm. In some aspects, mixing at block 103 may comprise optionally mixing a second amount of the precursor material with one or more of an ultraviolet dye, a monomer, a catalyst, and a releasing agent, or any combination thereof to produce a first mixture. The first mixture may be produced at a temperature of 23 to 27° C. and all ranges and values there between. The first mixture may be produced under vacuum. In some instances, the first mixture can be substantially homogenous. In some aspects, the mixing at block 103 may include cooling the first mixture to a temperature of 0 to 4° C. and all ranges and values there between including range of 0 to 0.5° C., 0.5 to 1.0° C., 1.0 to 1.5° C., 1.5 to 2.0° C., 2.0 to 2.5° C., 2.5 to 3.0° C., 3.0 to 3.5° C., 3.5 to 4.0° C. The first mixture may be cooled by a water bath from room temperature to about ° C.

In some aspects, mixing at block 103 may comprise flowing an inert gas over the cooled first mixture. In some instances, the inert gas may include nitrogen, argon, or any combination thereof. The inert gas may be adapted to prevent moisture in the air from contaminating the cooled first mixture. In some aspects, mixing at block 103 may comprise mixing the near infrared dye master batch into the cooled first mixture to produce a second mixture with each of the two or more near infrared absorbers at its concentration determined at block 202. The second mixture may be produced at a temperature in a range of 0 to 4° C. and all ranges and values there between including range of 0 to 0.5° C., 0.5 to 1.0° C., 1.0 to 1.5° C., 1.5 to 2.0° C., 2.0 to 2.5° C., 2.5 to 3.0° C., 3.0 to 3.5° C., 3.5 to 4.0° C. The second mixture may be produced under vacuum. In some instances, the second mixture is substantially homogenous.

In some embodiments, as shown in block 104, method 100 may comprise producing the optical element using the second mixture. In some aspects, the optical element may be produced via casting, injection molding, film extrusion, extrusion compression molding, compression molding, transfer molding, 3D printing, or any combination thereof. In some instances, the casting process at block 104 may be performed at a casting temperature of 20 to 25° C. and all ranges and values there between including 21° C., 22° C., 23° C., and 24° C. In some instances, the injection molding processing at block 104 may be performed at a molding temperature in a range of 200 to 400° C. and all ranges and values there between including ranges of 200 to 210° C., 210 to 220° C., 220 to 230° C., 230 to 240° C., 240 to 250° C., 250 to 260° C., 260 to 270° C., 270 to 280° C., 280 to 290° C., 290 to 300° C., 300 to 310° C., 310 to 320° C., 320 to 330° C., 330 to 340° C., 340 to 350° C., 350 to 360° C., 360 to 370° C., 370 to 380° C., 380 to 390° C., and 390 to 400° C. In some embodiments, method 100 may comprise mixing one or more of an ultraviolet light absorbing dye, a color balancing dye, a color enhancing dye, a blue light absorbing dye, and other visible light absorbing dyes with the precursor material before the producing step at block 104.

Although embodiments of the present invention have been described with reference to blocks of FIG. 1, it should be appreciated that operation of the present invention is not limited to the particular blocks and/or the particular order of the blocks illustrated in FIG. 1. Accordingly, some embodiments may provide functionality as described herein using various blocks in a sequence different than that of FIG. 1.

As part of the disclosure of the present invention, specific examples are included below. The examples are for illustrative purposes only and are not intended to limit the invention. Those of ordinary skill in the art will readily recognize parameters that can be changed or modified to yield essentially the same results.

EXAMPLE 1

Preparation of Near Infrared Absorbing Lenses with MR8™ Precursors

Various near infrared absorbers and precursor materials for optical substrate were used to produce ophthalmic lenses with infrared absorbing ability. The effect of ophthalmic lenses with two near infrared absorbers on infrared absorption wavelengths range and lens residual colors were tested. The specific near infrared absorbers, precursor materials, UV absorbers, and a catalyst used for producing the ophthalmic lenses are listed in Table 1 ($\lambda_{max}$ means the highest peak of NIR dye spectrum).

TABLE 1

Materials Used for Producing Ophthalmic Lenses

| Function | Chemical Trade Name | λmax | Supplier |
|---|---|---|---|
| Monomer | MR8-A | — | Mitsui Chemicals |
| Monomer | MR8-B1 | — | Mitsui Chemicals |
| Monomer | MR8-B2 | — | Mitsui Chemicals |
| Catalyst | Dimethyltin dichloride (DMC) | — | Honjo Chemical |
| UV Absorber | Seesorb 703 | — | Shipro Kasei Kaisha, |
| UV Absorber | Seesorb 709 | — | Shipro Kasei Kaisha, |
| NIR Absorber | Lumogen IR765 | 794 | BASF |
| NIR Absorber | NIR 920A | 951 | QCR |
| NIR Absorber | NIR S2007 | 1030 | Few Chemical |
| NIR Absorber | Epolight 4831 | 1025 | Epolin |

Table 2 shows the composition for each sample that uses near infrared absorber(s) of S2007 and/or 920A. The control sample did not include any near infrared absorber. Table 3 shows the composition for each sample that uses near infrared absorber(s) of 920A and/or IR765 with a control sample that did not include any near infrared absorber. Table 4 shows the composition for each sample that uses near infrared absorber(s) of Epolight 4831 and/or IR785 with a control sample that did not include any near infrared absorber.

TABLE 2

Compositions of Lenses Using S2007 and/or 920A NIR Absorbers

| Formulation No. | Sample # | | | | | | | | | Control |
| | 1 | 2 | 3 | 4 | 5 | 6 | 7 | 8 | 9 | 8 |
|---|---|---|---|---|---|---|---|---|---|---|
| MR 8 A | 50.60 | 50.60 | 50.60 | 50.60 | 50.60 | 50.60 | 50.60 | 50.60 | 50.60 | 50.600 |
| MR 8 B1 | 23.90 | 23.90 | 23.90 | 23.90 | 23.90 | 23.90 | 23.90 | 23.90 | 23.90 | 23.900 |
| MR 8 B2 | 24.50 | 23.50 | 22.50 | 20.50 | 15.50 | 10.50 | 19.50 | 14.50 | 9.50 | 25.500 |
| Stan DMC (ppm) | 0.040 | 0.040 | 0.040 | 0.040 | 0.040 | 0.040 | 0.040 | 0.040 | 0.040 | 0.040 |
| UV709 (ppm) | 1.200 | 1.200 | 1.200 | 1.200 | 1.200 | 1.200 | 1.200 | 1.200 | 1.200 | 1.200 |
| UV703 (ppm) | 0.0125 | 0.0125 | 0.0125 | 0.0125 | 0.0125 | 0.0125 | 0.0125 | 0.0125 | 0.0125 | 0.0125 |
| Zelec UN (ppm) | 0.070 | 0.070 | 0.070 | 0.070 | 0.070 | 0.070 | 0.070 | 0.070 | 0.0700 | 0.0700 |
| NIR S2007 (0.05% MB in MR8-B2) | 1.000 | 2.000 | 3.000 | — | — | — | 1.000 | 1.000 | 1.000 | — |
| NIR 920A (0.01% MB in MR8-B2) | — | — | — | 5.000 | 10.00 | 15.00 | 5.000 | 10.00 | 15.000 | — |
| Total | 101.32 | 101.32 | 101.32 | 101.32 | 101.32 | 101.32 | 101.32 | 101.32 | 101.32 | 101.32 |

TABLE 3

Compositions of Lenses Using 920A and/or IR765 NIR Absorbers

| Formulation No. | Sample # 1 | 2 | 3 | 4 | 5 | 6 | 7 | 8 | 9 | Control 8 |
|---|---|---|---|---|---|---|---|---|---|---|
| MR 8 A | 49.600 | 48.600 | 46.600 | 50.600 | 50.600 | 50.600 | 48.600 | 48.600 | 48.600 | 50.600 |
| MR 8 B1 | 23.900 | 23.900 | 23.900 | 23.900 | 23.900 | 23.900 | 23.900 | 23.900 | 23.900 | 23.900 |
| MR 8 B2 | 25.500 | 25.500 | 25.500 | 24.500 | 23.500 | 22.500 | 25.100 | 24.700 | 24.300 | 25.500 |
| Stan DMC (ppm) | 0.040 | 0.040 | 0.040 | 0.040 | 0.040 | 0.040 | 0.040 | 0.040 | 0.040 | 0.040 |
| UV709 (ppm) | 1.200 | 1.200 | 1.200 | 1.200 | 1.200 | 1.200 | 1.200 | 1.200 | 1.200 | 1.200 |
| UV703 (ppm) | 0.0125 | 0.0125 | 0.0125 | 0.0125 | 0.0125 | 0.0125 | 0.0125 | 0.0125 | 0.0125 | 0.0125 |
| Zelec UN (ppm) | 0.0700 | 0.0700 | 0.0700 | 0.0700 | 0.0700 | 0.0700 | 0.0700 | 0.0700 | 0.0700 | 0.0700 |
| NIR 920A (0.05% MB in MR8-A) | 1.000 | 2.000 | 4.000 | — | — | — | 2.000 | 2.000 | 2.000 | — |
| IR765 (0.05% MB in MR8-B2) | — | — | — | 1.000 | 2.000 | 3.000 | 0.400 | 0.800 | 1.200 | — |
| Total | 101.32 | 101.32 | 101.32 | 101.32 | 101.32 | 101.32 | 101.32 | 101.32 | 101.32 | 101.32 |

TABLE 4

Compositions of Lenses Using Epolight 4831 and/or IR765 NIR Absorbers

| Formulation No. | Sample # 1 | 2 | 3 | 4 | 5 | 6 | 7 | 8 | 9 | Control 8 |
|---|---|---|---|---|---|---|---|---|---|---|
| MR 8 A | 50.600 | 50.600 | 50.600 | 50.600 | 50.600 | 50.600 | 50.600 | 50.600 | 50.600 | 50.600 |
| MR 8 B1 | 23.900 | 23.900 | 23.900 | 23.900 | 23.900 | 23.900 | 23.900 | 23.900 | 23.900 | 23.900 |
| MR 8 B2 | 20.500 | 21.000 | 10.500 | 20.500 | 15.500 | 10.500 | 20.200 | 19.800 | 19.400 | 25.500 |
| Stan DMC (ppm) | 0.040 | 0.040 | 0.040 | 0.040 | 0.040 | 0.040 | 0.040 | 0.040 | 0.040 | 0.040 |
| UV709 (ppm) | 1.200 | 1.200 | 1.200 | 1.200 | 1.200 | 1.200 | 1.200 | 1.200 | 1.200 | 1.200 |
| UV703 (ppm) | 0.0125 | 0.0125 | 0.0125 | 0.0125 | 0.0125 | 0.0125 | 0.0125 | 0.0125 | 0.0125 | 0.0125 |
| Zelec UN (ppm) | 0.0700 | 0.0700 | 0.0700 | 0.0700 | 0.0700 | 0.0700 | 0.0700 | 0.0700 | 0.0700 | 0.0700 |
| Epolight 4831 (0.01% MB in MR8-B2) | 2.500 | 4.500 | 7.500 | — | — | — | 4.500 | 4.500 | 4.500 | — |
| IR765 (0.05% MB in MR8-B2) | — | — | — | 1.000 | 2.000 | 3.000 | 0.800 | 1.200 | 1.600 | — |
| Total | 101.32 | 101.32 | 101.32 | 101.32 | 101.32 | 101.32 | 101.32 | 101.32 | 101.32 | 101.32 |

All the samples were prepared using bi-plano molds, which were assembled using taping process. The center thickness of the mold was adjusted to 2 mm. The near infrared master batch was prepared by dissolving the selected near infrared absorber(s) in MR8™-A or MR8™-B2 monomer precursor. Ultraviolet absorbers (Stan DMC™ and Zelec UN™) were then mixed with MR8-A precursor in duran bottle at room temperature under vacuum until a homogenous mixture is formed. The homogenous mixture was then cooled to 2° C. before vacuum was released and nitrogen gas was flowed over the mixture. The near infrared dye master batch, additional MR8™-B1 and MR8™-B2, and the cooled homogenous mixture were mixed under vacuum at 2° C. until the final mixture was homogenous. The final mixture was subsequently filled into the bi-plano mold via a clean syringe. The lens samples were then formed by following the polymerization temperature profile as shown in Table 5. For each composition, uncoated (UNC) lenses and hard multi-coated (HMC) lenses were both produced. The produced lenses were cleaned. The transmittance in the range of 300 to 2000 nm wavelengths was measured for each lens sample using Lamda™ 950, UV spectroscopy (PerkinElmer, USA). Additionally, TsIR, TvD65, YI, C*, h*, and UV cut for each lens sample were tested, where TsIR is the % Transmittance in 780-2000 nm., TvD65 is % Transmittance in 380-780 nm. YI is Yellow Index, C* is Chroma, and h* is Hue.

TABLE 5

Polymerization Temperature Profile for MR8 based Lenses

| Temp Start (° C.) | Temp Finish (° C.) | Period (Hr.) |
|---|---|---|
| 15.0 | 15.1 | 1.0 |
| 15.1 | 15.2 | 1.0 |
| 15.2 | 15.4 | 1.0 |
| 15.4 | 15.7 | 1.0 |
| 15.7 | 16.2 | 1.0 |
| 16.2 | 17.0 | 1.0 |
| 17.0 | 18.4 | 1.0 |
| 18.4 | 20.6 | 1.0 |
| 20.6 | 22.0 | 1.0 |

TABLE 5-continued

Polymerization Temperature Profile for MR8 based Lenses

| Temp Start (° C.) | Temp Finish (° C.) | Period (Hr.) |
|---|---|---|
| 22.0 | 27.0 | 1.0 |
| 27.0 | 34.0 | 1.0 |
| 34.0 | 45.0 | 1.0 |
| 45.0 | 60.0 | 1.0 |
| 60.0 | 80.0 | 1.0 |
| 80.0 | 105.0 | 1.0 |
| 105.0 | 130.0 | 1.0 |
| 130.0 | 130.0 | 1.0 |
| 130.0 | 130.0 | 1.0 |
| 130.0 | 130.0 | 1.0 |
| 130.0 | 125.0 | 1.0 |
| 125.0 | | |
| 125.0 | | |
| 125.0 | | |

Figure 2A:
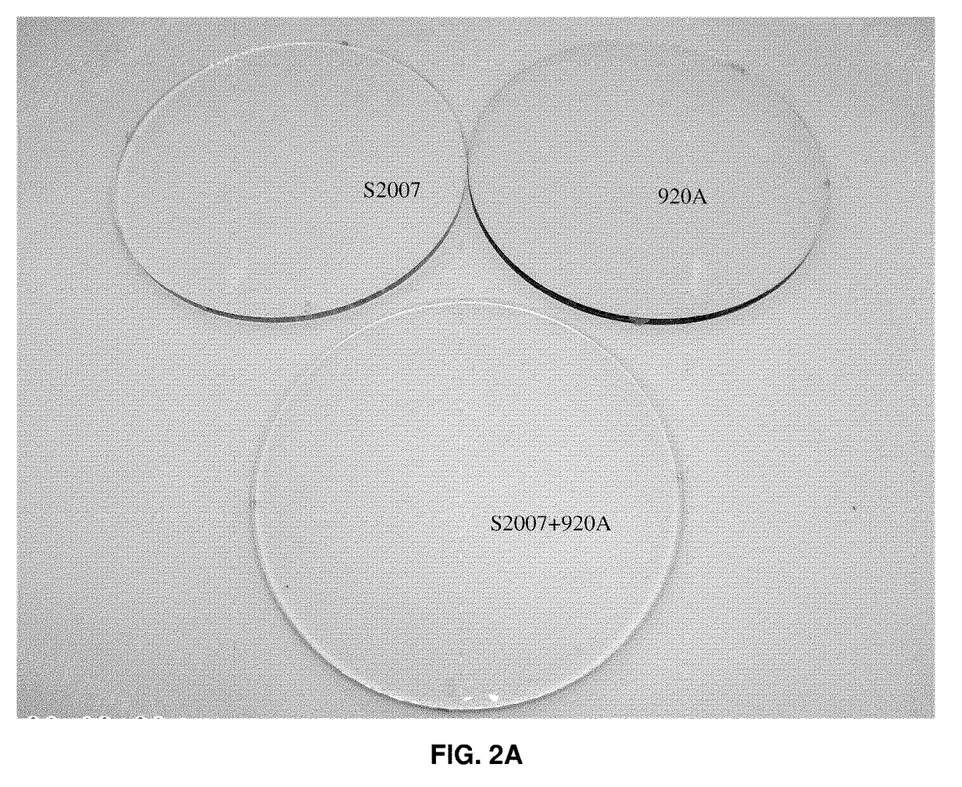
FIG. 2A shows the residual color comparison between an ophthalmic lens containing S2007 and 920A near infrared absorbers and ophthalmic lenses containing one of S2007 and 920A near infrared absorbers.
Figure 2B:
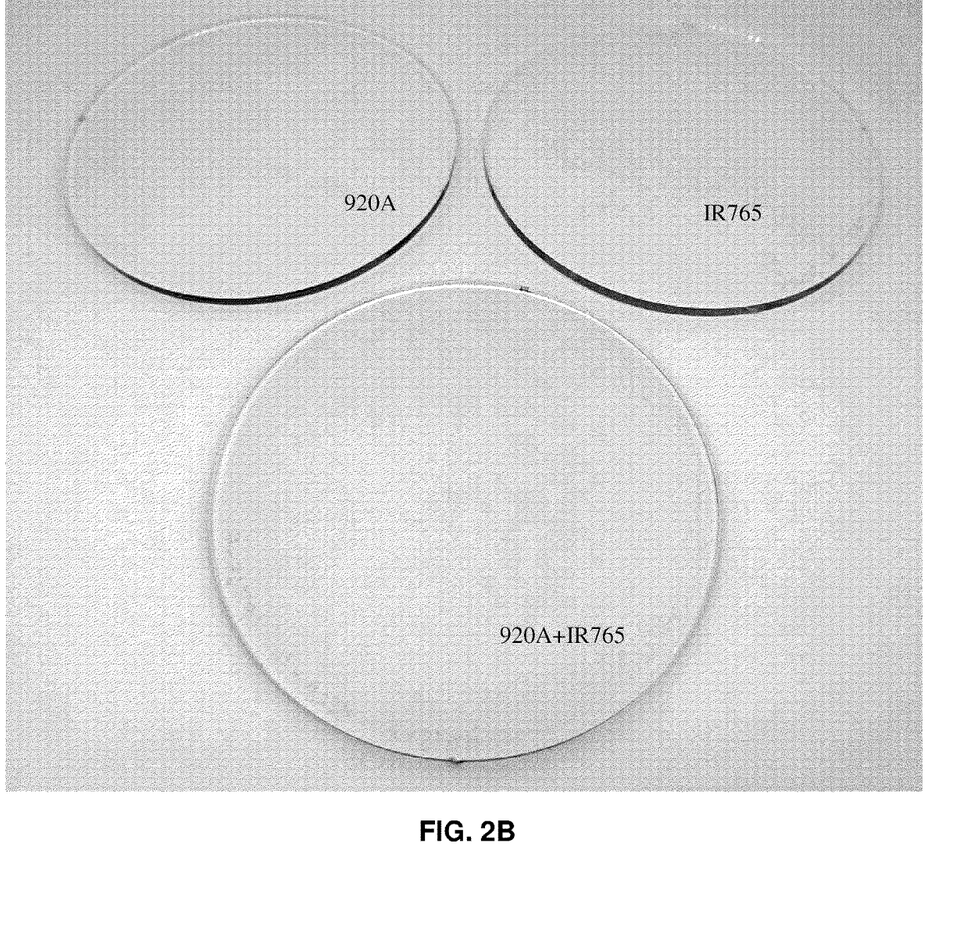
FIG. 2B shows the residual color comparison between an ophthalmic lens containing 920A and IR765 near infrared absorbers and ophthalmic lenses containing one of 920A and IR765 near infrared absorbers.
Figure 2C:
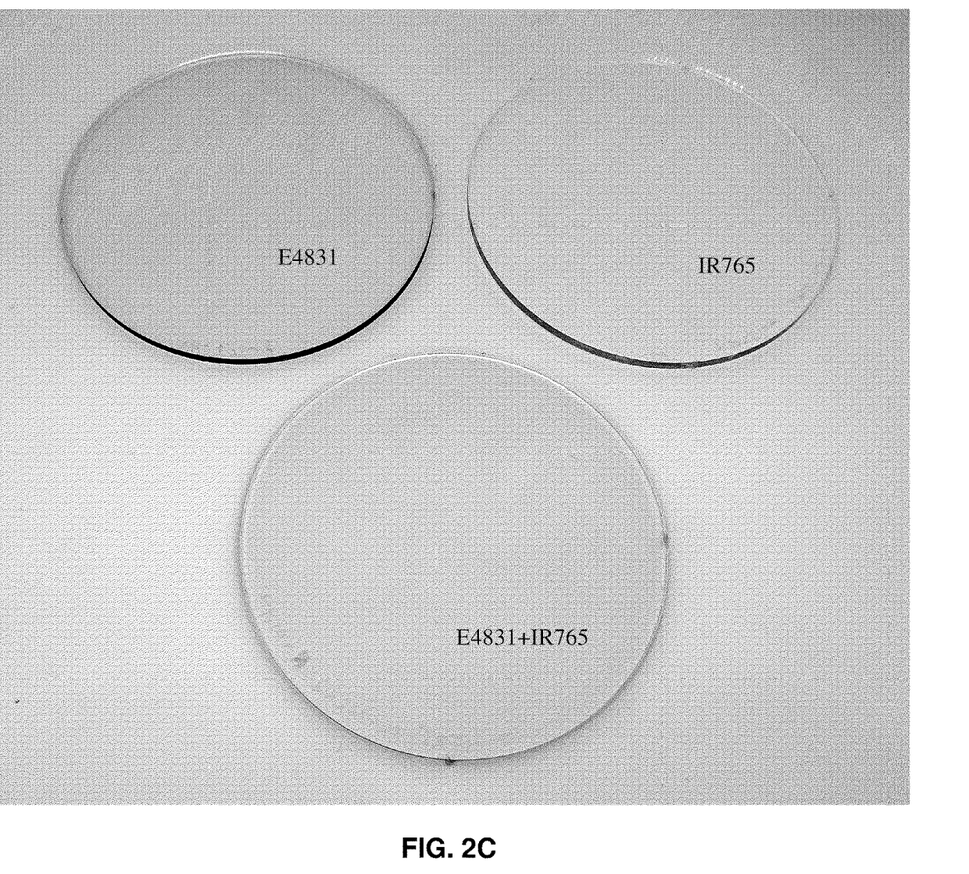
FIG. 2C shows the residual color comparison between an ophthalmic lens containing Epolight 4831 and IR765 near infrared absorbers and ophthalmic lenses containing one of Epolight 4831 and IR765 near infrared absorbers.

The appearance of the lens samples were shown in FIGS. 2A-2C. As shown in FIGS. 2A-2C, lenses that contains two near infrared absorbers (S2007 and 920A for FIG. 2A, 920A and IR765 for FIG. 2B, and Epolight 4831 and IR765 for FIG. 2C) showed reduced residual color compared to lens samples that contain only one of the near infrared absorber.

Table 6 shows the test results of TsIR, TvD65, YI, C*, h*, and UV cut for uncoated (UNC) lenses sample containing NIR S2007 and 920A near infrared absorbers. Table 7 shows shows the test results of TsIR, TvD65, YI, C*, h*, and UV cut for hard multi-coated lenses sample containing NIR S2007 and 920A near infrared absorbers. These results show that the hard multi coated and uncoated lenses containing 5 ppm S2007 and 5 ppm 920A showed the best infrared absorption properties and least residual colors. These two samples have the best neutral colors, which are closest to clear lens.

TABLE 6

Results of MR8 UNC Lenses with NIR S2007 and 920A

| Formulation No. | Sample # | | | | | | | | | Control |
|---|---|---|---|---|---|---|---|---|---|---|
| | 1 | 2 | 3 | 4 | 5 | 6 | 7 | 8 | 9 | 10 |
| NIR S2007 (ppm) | 5 | 10 | 15 | — | — | — | 5 | 5 | 5 | — |
| NIR 920A (ppm) | — | — | — | 5 | 10 | 15 | 5 | 10 | 15 | — |
| TsIR (@780-2000 nm) | 75.05 | 67.50 | 61.65 | 79.73 | 75.37 | 71.57 | 71.33 | 69.45 | 67.53 | 84.70 |
| NIR cut (@780-2000 nm) | 24.95 | 32.50 | 38.35 | 20.27 | 24.63 | 28.43 | 28.67 | 30.55 | 32.47 | 15.30 |
| TvD65 | 88.3 | 86.6 | 85.7 | 87.0 | 84.3 | 81.4 | 84.5 | 80.7 | 77.2 | 89.8 |
| YI | 3.0 | 3.8 | 4.6 | 2.5 | 2.9 | 3.4 | 2.1 | 1.8 | 1.1 | 2.1 |
| C* | 2.2 | 2.7 | 3.2 | 1.7 | 1.6 | 1.7 | 1.6 | 1.3 | 0.7 | 1.7 |
| h* | 110.8 | 109.6 | 107.4 | 103.9 | 91.9 | 80.4 | 115.5 | 110.7 | 112.0 | 114.1 |
| UV cut | 395.0 | 395.0 | 395.0 | 395.0 | 395.0 | 395.0 | 395.0 | 395.0 | 395.0 | 394.8 |

TABLE 7

Results of MR8 HMC Lenses with NIR S2007 and 920A near infrared absorbers

| Formulation No. | Sample # | | | | | | | | | Control |
|---|---|---|---|---|---|---|---|---|---|---|
| | 1 | 2 | 3 | 4 | 5 | 6 | 7 | 8 | 9 | 10 |
| NIR S2007 (ppm) | 5 | 10 | 15 | — | — | — | 5 | 5 | 5 | — |
| NIR 920A (ppm) | — | — | — | 5 | 10 | 15 | 5 | 10 | 15 | — |
| TsIR (@780-2000 nm) | 67.80 | 60.60 | 56.70 | 72.10 | 68.10 | 63.90 | 63.90 | 62.10 | 59.90 | 76.20 |
| NIR cut (@780-2000 nm) | 32.20 | 39.40 | 43.30 | 27.90 | 31.90 | 36.10 | 36.10 | 37.90 | 40.10 | 23.80 |
| TvD65 | 96.4 | 95.1 | 93.4 | 96.5 | 94.3 | 91.7 | 92.7 | 88.9 | 84.7 | 97.9 |
| YI | 2.3 | 3.6 | 4.3 | 2.9 | 4.8 | 6.7 | 1.6 | 2.0 | 1.7 | 1.2 |
| C* | 1.47 | 2.10 | 2.49 | 1.74 | 2.55 | 3.36 | 1.27 | 1.16 | 0.89 | 1.07 |
| h* | 97.30 | 91.70 | 91.70 | 92.10 | 80.20 | 74.60 | 110.10 | 94.80 | 82.70 | 112.50 |
| UV cut | 396.0 | 396.0 | 396.0 | 396.0 | 396.0 | 396.0 | 395.0 | 395.0 | 395.0 | 395.0 |

Table 8 shows the test results of TsIR, TvD65, YI, C*, h*, and UV cut for uncoated (UNC) lenses sample containing 930A and IR765 near infrared absorbers. Table 9 shows the test results of TsIR, TvD65, YI, C*, h*, and UV cut for uncoated (UNC) lenses sample containing 930A and IR765 near infrared absorbers. These results show that the hard multi coated lenses containing 10 ppm 920A and 4 ppm IR765 showed the best infrared absorption properties and least residual colors. These two samples have the best neutral colors, which are closest to clear lens.

TABLE 8

Results of MR8 UNC Lenses with 920A and IR765 near infrared absorbers

| Formulation No. | Sample # | | | | | | | | | Control |
| --- | --- | --- | --- | --- | --- | --- | --- | --- | --- | --- |
| | 1 | 2 | 3 | 4 | 5 | 6 | 7 | 8 | 9 | 8 |
| NIR 920A (ppm) | 5 | 10 | 20 | — | — | — | 10 | 10 | 10 | — |
| IR765 (ppm) | — | — | — | 5 | 10 | 15 | 2 | 4 | 6 | — |
| TsIR (@780-2000 nm) | 78.33 | 72.97 | 64.53 | 80.70 | 76.10 | 73.80 | 71.15 | 69.25 | 68.30 | 84.70 |
| NIR cut (@780-2000 nm) | 21.67 | 27.03 | 35.47 | 19.30 | 23.90 | 26.20 | 28.85 | 30.75 | 31.70 | 15.30 |
| TvD65 | 87.8 | 86.0 | 82.6 | 88.5 | 87.1 | 86.2 | 85.8 | 85.4 | 84.7 | 89.8 |
| YI | 2.8 | 3.4 | 4.8 | 0.2 | −0.6 | −1.7 | 2.6 | 2.0 | 1.5 | 2.1 |
| C* | 1.7 | 1.8 | 2.3 | 2.2 | 2.9 | 3.6 | 1.8 | 1.8 | 1.9 | 1.7 |
| h* | 101.1 | 90.7 | 75.0 | 148.6 | 157.5 | 165.1 | 106.6 | 119.5 | 129.9 | 114.1 |
| UV cut | 395.0 | 395.0 | 395.0 | 395.0 | 395.0 | 394.5 | 395.0 | 395.0 | 395.0 | 394.8 |

TABLE 9

Results of MR8 HMC Lenses with 920A and IR765 near infrared absorbers

| Formulation No. | Sample # | | | | | | | | | Control |
| --- | --- | --- | --- | --- | --- | --- | --- | --- | --- | --- |
| | 1 | 2 | 3 | 4 | 5 | 6 | 7 | 8 | 9 | 8 |
| NIR 920A (ppm) | 5 | 10 | 20 | — | — | — | 10 | 10 | 10 | — |
| IR765 (ppm) | — | — | — | 5 | 10 | 15 | 2 | 4 | 6 | — |
| TsIR (@780-2000 nm) | 70.70 | 64.90 | 57.60 | 71.30 | 67.90 | 65.90 | 63.50 | 61.70 | 60.60 | 76.20 |
| NIR cut (@780-2000 nm) | 29.30 | 35.10 | 42.40 | 28.70 | 32.10 | 34.10 | 36.50 | 38.30 | 39.40 | 23.80 |
| TvD65 | 96.3 | 94.5 | 90.6 | 96.2 | 95.8 | 95.4 | 93.9 | 93.6 | 92.8 | 97.9 |
| YI | 2.1 | 3.3 | 4.9 | −0.4 | −1.4 | −2.5 | 2.1 | 1.6 | 1.1 | 1.2 |
| C* | 1.26 | 1.79 | 2.40 | 1.8 | 2.66 | 3.35 | 1.40 | 1.48 | 1.56 | 1.07 |
| h* | 93.10 | 81.20 | 66.90 | 155.4 | 165.70 | 172.60 | 100.60 | 116.80 | 130.30 | 112.50 |
| UV cut | 395.0 | 395.0 | 395.0 | 395.0 | 396.0 | 396.0 | 395.0 | 395.0 | 395.0 | 395.0 |

Table 10 shows the test results of TsIR, TvD65, YI, C*, h*, and UV cut for uncoated (UNC) lenses sample containing Epolight 4831 and/or IR785 near infrared absorbers. Table 11 shows the test results of TsIR, TvD65, YI, C*, h*, and UV cut for hard multi coated (HMC) lenses sample containing Fpolight 4831 and/or IR785 near infrared absorbers. The results showed that the hard multi coated lenses containing 45 ppm Epolight 4831 and 6 ppm IR765 showed the best results for lenses containing Epolight 4831 and/or IR785 near infrared absorbers as these two samples have the best neutral colors, which are the closest to clear lens. Overall, the results in Tables 6-11 indicate that MR8 monomer based lenses with 2 near infrared absorbers improve the absorption level and absorption wavelengths range, and reduce the residual colors of the lenses compared to lenses containing only 1 near infrared absorber.

TABLE 10

Results of MR8 UNC Lenses with Epolight 4831 and IR765 NIR Absorbers

| Formulation No. | Sample # | | | | | | | | | Control |
|---|---|---|---|---|---|---|---|---|---|---|
| | 1 | 2 | 3 | 4 | 5 | 6 | 7 | 8 | 9 | 8 |
| Epolight 4831 (ppm) | 25 | 45 | 75 | — | — | — | 45 | 45 | 45 | — |
| IR765 (ppm) | — | — | — | 5 | 10 | 15 | 4 | 6 | 8 | — |
| TsIR (@780-2000 nm) | 76.00 | 66.10 | 65.35 | 80.70 | 76.10 | 73.80 | 62.90 | 62.10 | 60.93 | 84.70 |
| NIR cut (@780-2000 nm) | 24.00 | 33.90 | 34.65 | 19.30 | 23.90 | 26.20 | 37.10 | 37.90 | 39.07 | 15.30 |
| TvD65 | 88.2 | 85.4 | 85.2 | 88.5 | 87.1 | 86.2 | 84.7 | 84.6 | 84.1 | 89.8 |
| YI | 2.4 | 3.9 | 3.7 | 0.2 | −0.6 | −1.7 | 2.5 | 1.6 | 1.0 | 2.1 |
| C* | 1.6 | 2.0 | 1.9 | 2.2 | 2.9 | 3.6 | 1.7 | 1.7 | 1.8 | 1.7 |
| h* | 104.7 | 75.2 | 78.7 | 148.6 | 157.5 | 165.1 | 104.9 | 121.5 | 134.6 | 114.1 |
| UV cut | 395.0 | 395.0 | 395.0 | 395.0 | 395.0 | 394.5 | 395.7 | 395.3 | 395.0 | 394.8 |

TABLE 11

Results of MR8 HMC Lenses with Epolight 4831 and IR765 NIR Absorbers

| Formulation No. | Sample # | | | | | | | | | Control |
|---|---|---|---|---|---|---|---|---|---|---|
| | 1 | 2 | 3 | 4 | 5 | 6 | 7 | 8 | 9 | 8 |
| Epolight 4831 (ppm) | 25 | 45 | 75 | — | — | — | 45 | 45 | 45 | — |
| IR765 (ppm) | — | — | — | 5 | 10 | 15 | 4 | 6 | 8 | — |
| TsIR (@780-2000 nm) | 68.60 | 60.20 | 58.80 | 71.30 | 67.90 | 65.90 | 56.90 | 55.90 | 54.60 | 84.70 |
| NIR cut (@780-2000 nm) | 31.40 | 39.80 | 41.20 | 28.70 | 32.10 | 34.10 | 43.10 | 44.10 | 45.40 | 15.30 |
| TvD65 | 96.1 | 93.6 | 92.9 | 96.2 | 95.8 | 95.4 | 92.8 | 92.2 | 91.5 | 89.8 |
| YI | 1.6 | 2.8 | 3.0 | −0.4 | −1.4 | −2.5 | 1.4 | 0.6 | 0.1 | 2.1 |
| C* | 1.14 | 1.51 | 1.59 | 1.8 | 2.66 | 3.35 | 1.13 | 1.16 | 1.45 | 1.7 |
| h* | 100.50 | 66.40 | 66.10 | 155.4 | 165.7 | 172.6 | 105.6 | 132.00 | 144.40 | 114.1 |
| UV cut | 395.0 | 395.0 | 395.0 | 395.0 | 396.0 | 396.0 | 395.0 | 396.0 | 395.0 | 394.8 |

EXAMPLE 2

Preparation of Near Infrared Absorbing Lenses with Polycarbonate Precursors

Polycarbonate based lenses with different infrared absorbers were produced to test the synergistic effect of two infrared absorbers on the infrared absorbing properties and residual colors of the lenses. The near infrared absorbers used were shown in Table 12.

TABLE 12

List of Near Infrared Absorbers

| NIRAbsorber Name | NIR Absorber code | λmax (nm) | Supplier |
|---|---|---|---|
| Epolight 4831 | NIR6 | 1040 | Epolin |
| Epolight 3169 | NIR12 | 946 | Epolin |
| Epolight 3157 | NIR13 | 886 | Epolin |

In each polycarbonate lens sample, two of these near infrared absorbers were mixed with polycarbonate pellets. The mixture was then injection-molded into ophthalmic lenses. The light transmittance and color properties of each lens sample were measured using Lamda™ 900 (Perkin Elmer, USA).

The compositions of polycarbonate lens samples that contain two near infrared absorbers and the compositions of corresponding comparative examples are list in Table 13. The first set of polycarbonate lens contained Epolight 4831 and Epolight 3169 near infrared absorbers. The second set of polycarbonate lens contained Epolight 4831 and Epolight 3157 near infrared absorbers.

TABLE 13

Compositions of Polycarbonate Lenses with Near Infrared Absorbers

| Formulation | Set # | | Comparative Example | | | | | | |
|---|---|---|---|---|---|---|---|---|---|
| | 1 | 2 | 3 | 4 | 5 | 6 | 7 | 8 | 9 |
| PC (wt %) | 99.8 | 99.8 | 100 | 99.9 | 99.8 | 99.9 | 99.8 | 99.9 | 99.8 |
| Epolight 4831 (wt %) | 0.01 | 0.01 | NA | 0.01 | 0.02 | NA | NA | NA | NA |
| Epolight 3169 (wt %) | 0.01 | NA | NA | NA | NA | 0.01 | 0.02 | NA | NA |
| Epolight 3157 (wt %) | NA | 0.01 | NA | NA | NA | NA | NA | 0.01 | 0.02 |

Figure 3A:
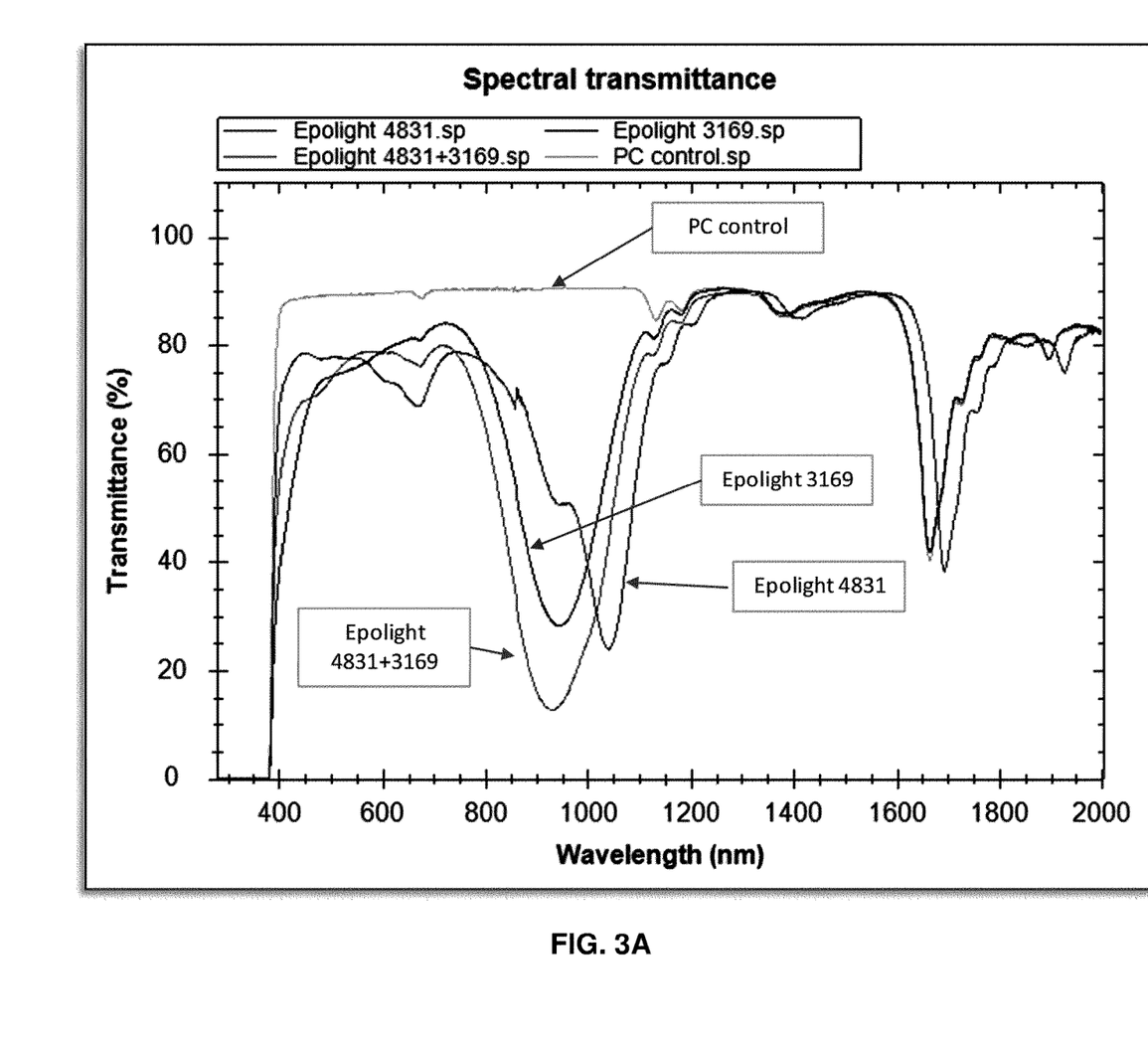
FIG. 3A shows spectral transmittance of an ophthalmic lens containing both Epolight 4831 and Epolight 3169 near infrared absorbers, an ophthalmic lens containing Epolight 4831 near infrared absorber, and an ophthalmic lens containing Epolight 3169 near infrared absorber.

The test results of the first set polycarbonate lenses containing Epolight 4831 and Epolight 3169 near infrared absorbers are listed in Table 14. The results of light transmittance for each sample is plotted in FIG. 3A. FIG. 3A shows that the polycarbonate lenses containing both Epolight 4831 and Epolight 3169 near infrared absorbers have a broader near infrared wavelengths cut range than lenses that contain only one of these near infrared absorbers. Additionally, as shown in Table 14, the residual color intensity for polycarbonate lenses containing both Epolight 4831 and Epolight 3169 near infrared absorbers is lower (grey color) than that of lenses (blue or brown color) containing only one of these near infrared absorbers.

TABLE 14

Test Results for PC Lenses with Epolight 4831 and Epolight 3169 NIR Absorbers

| Formulation | Set# | Comparative Examples | | | | |
|---|---|---|---|---|---|---|
| | 1 | C3 | C4 | C5 | C6 | C7 |
| PC (wt %) | 98.8 | 100 | 99.9 | 99.8 | 99.9 | 99.8 |
| Epolight 4831 (wt %) | 0.01 | NA | 0.01 | 0.02 | NA | NA |
| Epolight 3169 (wt %) | 0.01 | NA | NA | NA | 0.01 | 0.02 |
| $TsIR_{780-2000}$ (%) | 56.6 | 88.1 | 77.8 | 66.3 | 75.6 | 66.0 |
| NIR cut (100-$TsIR_{780-2000}$) (%) | 43.4 | 11.9 | 22.2 | 33.7 | 24.4 | 34.0 |
| TvD65 (%) | 77.3 | 89.3 | 84.0 | 76.3 | 83.3 | 76.4 |
| YI D65 (2°) | 11.2 | 0.9 | −1.5 | −4.1 | 7.9 | 15.7 |
| C* (10°) | 6.4 | 0.5 | 1.1 | 2.4 | 4.9 | 9.4 |
| h* (10°) | 97.4 | 94.5 | 194.6 | 202.2 | 100.6 | 98.1 |
| Visual color | Grey | | | Blue | | Brown |

Figure 3B:
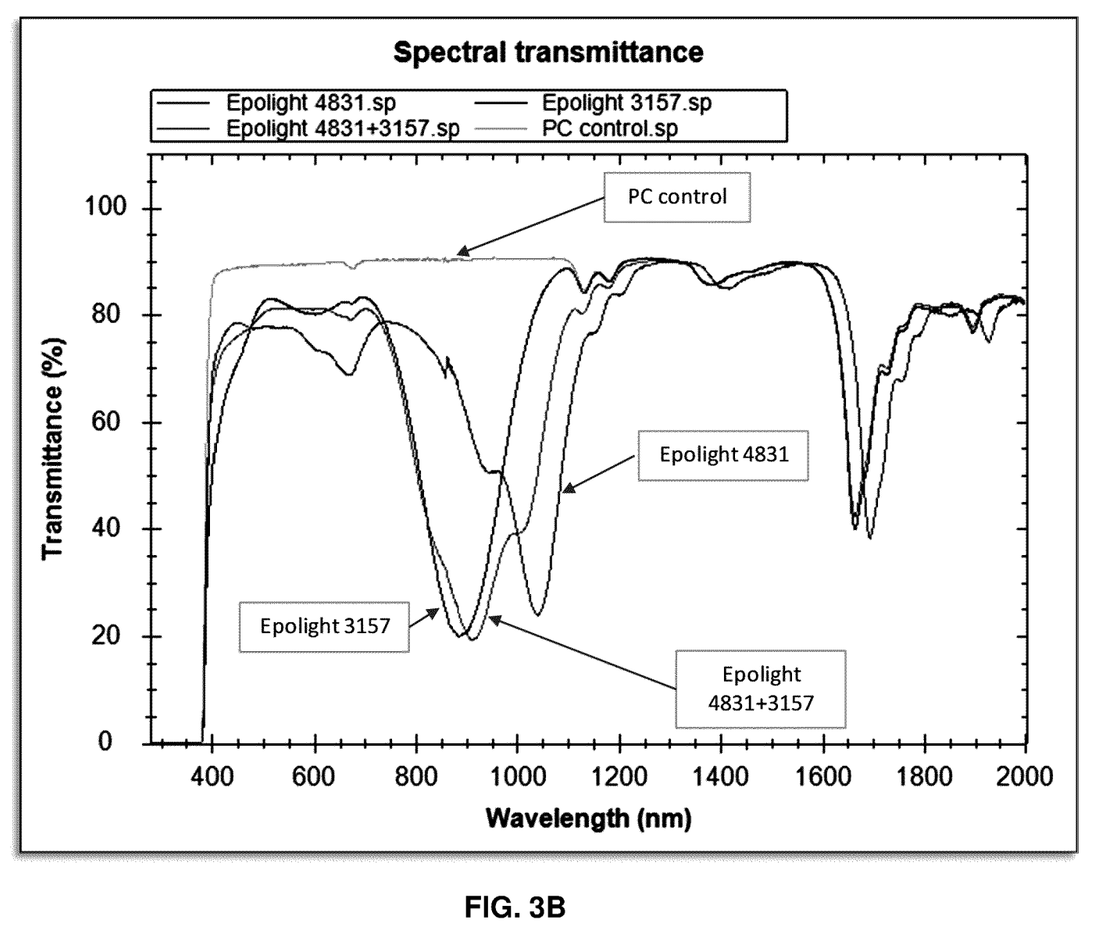
FIG. 3B shows spectral transmittance of an ophthalmic lens containing both Epolight 4831 and Epolight 3157 near infrared absorbers, an ophthalmic lens containing Epolight 4831 near infrared absorber, and an ophthalmic lens containing Epolight 3157 near infrared absorber.

The test results of the second set polycarbonate lenses containing Epolight 4831 and Epolight 3157 near infrared absorbers are listed in Table 15. The results of light transmittance for each sample is plotted in FIG. 3B. FIG. 3B shows that the polycarbonate lenses containing both Epolight 4831 and Epolight 3157 near infrared absorbers have a broader near infrared wavelengths cut range than lenses that contain only one of these near infrared absorbers. Additionally, as shown in Table 15, the residual color intensity for polycarbonate lenses containing both Epolight 4831 and Epolight 3157 near infrared absorbers is lower (grey color) than that of lenses (blue or yellow-green) containing only one of these near infrared absorbers.

TABLE 15

Test Results for PC Lenses with Epolight 4831 and Epolight 3157 NIR Absorbers

| Formulation | Set# | Comparative Examples | | | | |
|---|---|---|---|---|---|---|
| | 2 | C3 | C4 | C5 | C8 | C9 |
| PC (wt %) | 99.8 | 100 | 99.9 | 99.8 | 99.9 | 99.8 |
| Epolight 4831 (wt %) | 0.01 | NA | 0.01 | 0.02 | NA | NA |
| Epolight 3157 (wt %) | 0.01 | NA | NA | NA | 0.01 | 0.02 |
| $TsIR_{780-2000}$ (%) | 57.9 | 88.1 | 77.8 | 66.3 | 76.2 | 63.9 |
| NIR cut (100-$TsIR_{780-2000}$) (%) | 42.1 | 11.9 | 22.2 | 33.7 | 23.8 | 36.1 |
| TvD65 (%) | 80.8 | 89.3 | 84.0 | 76.3 | 86.2 | 81.1 |
| YI D65 (2°) | 5.7 | 0.9 | −1.5 | −4.1 | 4.5 | 10.3 |
| C* (10°) | 4.0 | 0.5 | 1.1 | 2.4 | 3.7 | 8.7 |
| h* (10°) | 111.0 | 94.5 | 194.6 | 202.2 | 117.6 | 118.4 |
| Visual color | Grey | | | Blue | | Yellow-Green |

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, treatment, machine, manufacture, composition of matter, means, methods, and/or steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. An ophthalmic lens comprising an optical substrate and two or more near infrared absorbers mixed in the optical substrate, wherein the two or more near infrared absorbers have different near infrared cut ranges and different residual colors; wherein the two or more near infrared absorbers in the optical substrate are adapted to generate a synergistic color intensity that is lower than individual color intensity of each of the two or more near infrared absorbers; and wherein the ophthalmic lens exhibits infrared absorbing ability.

2. The ophthalmic lens of claim 1, wherein the two or more near infrared absorbers are mixed in the optical substrate substantially homogenously.

3. The ophthalmic lens of claim 1, wherein the two or more near infrared absorbers in the optical substrate are adapted to generate a synergistic infrared absorption level that is higher than individual near infrared absorption level of any of the two or more near infrared absorbers.

4. The ophthalmic lens of claim 1, wherein the two or more near infrared absorbers in the optical substrate are adapted to generate a synergistic infrared absorption range that is broader than individual infrared absorption range of each of the two or more near infrared absorbers.

5. The ophthalmic lens of claim 1, wherein the two or more near infrared absorbers in the optical substrate are synergistically neutral colored.

6. The ophthalmic lens of claim 1, wherein the two or more near infrared absorbers are adapted to synergistically cause less than 10% reduction on the average optical transmittance in the 380-780 nm wavelength range for the ophthalmic lens.

7. The ophthalmic lens of claim 1, wherein the optical substrate comprises allyl diglycol carbonate, polyurethane, acrylic, polycarbonate, polyamide, poly(methyl methacrylate), co-polyester, cellulose triacetate, polyepisulfides, trivex, polyacrylics, polyols, polyamines, polyanhydrides, polycarboxilic acids, polyepoxides, polyisocyanates, polynorbornenes, polysiloxanes, polysilazanes, polystyrenes, polyolefinics, polyesters, polyimides, polyurethanes, polythiourethanes, polyallylics, polysulfides, polyvinylesters, polyvinylethers, polyarylenes, polyoxides, polysulfones, poly cyclo olefins, polyacrylonitriles, polyethylene terephtalates, polyetherimides, polypentenes, or any combinations thereof.

8. The ophthalmic lens of claim 1, wherein the two or more near infrared absorbers comprise polymethine, phthalocyanine, porphyrine, triphenylmethane, iminium, squarylium, croconium, dithiolene, quinone, polyperylene, pyrilium, thiopyrilium, cyanine, or any combination thereof.

9. The ophthalmic lens of claim 1, wherein the optical substrate comprises 1 to 500 ppm of the two or more near infrared absorbers.

10. A method of preparing the ophthalmic lens of claim 1, the method comprising:
providing a precursor material for the optical substrate and the two or more near infrared absorbers that have different near infrared cut ranges and/or different residual colors;
determining a concentration for each of the two or more infrared absorbers in the optical substrate, at which the synergistic color intensity of the two or more near infrared absorbers is lower than the individual color intensity of any of the two or more near infrared absorbers;
mixing the precursor material with the two or more infrared absorbers at the determined concentrations to produce a substantially homogenous mixture; and
producing the ophthalmic lens using the mixture of the optical substrate and the two or more near infrared absorbers.

11. The method of claim 10, wherein the producing step comprises casting, injection molding, extrusion compression molding, compression molding, transfer molding, 3D printing, or any combination thereof.

12. The method of claim 10, further comprising mixing one or more of an ultraviolet light absorbing dye, a color balancing dye, a color enhancing dye, a blue light absorbing dye, and other visible light absorbing dyes with the precursor material before the producing step.

13. A method of preparing the ophthalmic lens of claim 1, the method comprising:
providing a precursor material for the optical substrate and two or more near infrared absorbers that have different near infrared cut ranges and/or different residual colors;
determining a concentration for each of the two or more infrared absorbers in the substrate, at which synergistic color intensity of two or more near infrared absorbers is lower than the individual color intensity of any of the two or more near infrared absorbers;
dissolving the two or more infrared absorbers in a first amount of the precursor material to produce a near infrared dye master batch;
mixing a second amount of the precursor material with one or more of an ultraviolet dye, a monomer, a catalyst, and a releasing agent at a temperature of 23 to 27° C. under vacuum to produce a first mixture that is substantially homogenous;
cooling the first mixture to a temperature of 0 to 4° C.;
flowing an inert gas over the cooled first mixture;
mixing the near infrared dye master batch into the first mixture under vacuum at a temperature of 0 to 4° C. to produce a second mixture, which is a substantially homogenous mixture with each of the two or more near infrared absorbers at its determined concentration; and
producing the ophthalmic lens using the second mixture via casting.

14. The ophthalmic lens of claim 1, wherein the two or more near infrared absorbers in the optical substrate are achromatic.

* * * * *